United States Patent Office 3,027,346
Patented Mar. 27, 1962

3,027,346
PROCESS FOR PREPARING COMPOSITION CONTAINING GRAFT COPOLYMER OF POLYETHYLENE AND AN ACRYLATE MONOMER
Frank M. Rugg and James E. Potts, West Caldwell, N.J., assignors to Union Carbide Corporation, a corporation of New York
No Drawing. Filed Nov. 15, 1956, Ser. No. 622,236
7 Claims. (Cl. 260—45.5)

This invention relates to a process for preparing polymerization products derived from polyethylene. More particularly, it relates to thermoplastic reaction products of polyethylene with esters of acrylic and methacrylic acid.

Polyethylenes can be obtained by polymerizing ethylene in the presence of a catalyst to form products ranging from low molecular weight oils and greases, to normally solid polymers having molecular weights above about 100,000. These polymers may be prepared employing various pressure media, i.e. superatmospheric, atmospheric or subatmospheric pressures. Illustrative methods using superatmospheric pressure are described in United States Patents 2,153,553 and 2,188,465.

The physical properties of the polyethylenes having molecular weights ranging from 18,000 to 30,000 are characterized by their good toughness and pliability over a wide range of temperatures.

Despite these outstanding chemical and physical properties of the polyethylenes there have been certain limitations to their use. Thus, their tendency to crack when stressed, an effect that has been termed "environmental stress cracking" has led to the mechanical incorporation of polyisobutylene with polyethylenes to correct this tendency. Their non-polar structure makes it difficult to print or apply a coating to the surface of the polyethylene films. The films also do not adhere well to other surfaces, and no generally satisfactory adhesive for polyethylene films is known.

A number of attempts have been made to improve the limiting properties of the polyethylenes, for example, by mechanically incorporating other polymers; by polymerizing ethylene monomer in the presence of another monomer such as vinyl chloride to form copolymers which may be represented diagrammatically as follows:

in which E represents an ethylene segment and V the other monomeric residue.

Still another method is to interrupt the polymerization of a particular monomer, at some intermediate state, and then add ethylene which supposedly adds to segments of the polymerized monomer (V) forming a so-called segmented polymer which can be represented thus:

where E is the ethylene segment and V the other monomeric segment.

While these methods have given polyethylenes which, in some cases do have certain improved properties, such as better resistance to "environmental stress cracking," the products have such better properties usually at a sacrifice of the good properties of polyethylenes. Thus, mechanical mixtures of polymers usually blush when creased or cold drawn. The copolymerization of ethylene with other monomers is not easy to control and the resulting product is radically different in properties from polyethylene. Methods which involve oxidation of the polyethylene are to be avoided since the products obtained often show a marked reduction in mechanical strength.

This invention, therefore, is concerned with a method for preparing polyethylene which does not bring about a degradation of the desirable properties of polyethylene, but which provides graft copolymers containing at least one percent and as much as 20 percent by weight of esters of acrylic acid and methacrylic acid as described hereinbelow grafted to said polyethylene. These graft copolymers manifest unusually desirable properties particularly as regards the retention of printing inks, e.g. flexographic inks, gravure inks, heat set and steam set inks.

This invention provides a process in which the polyethylenes are used in their completed homopolymeric form, i.e. homoploymers of ethylene of different molecular weights are employed but the molecular weight does not decrease in the process of modification. Instead, it is increased by a process which has been aptly termed a "grafting process." This means that another homopolymer chain is chemically grafted to a main stem or back-bone of homopolymeric ethylene. Pictorially, this can be represented as follows:

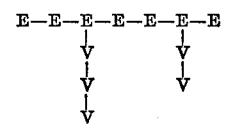

where E represents an ethylene segment and V a monomeric segment of a monomer other than ethylene.

Generally speaking, in order to bring about grafting the backbone polymer cannot be too chemically inert but should possess certain so-called "active points" to which the graft can attach itself. These "active points" may result, for example, from the presence of some form of unsaturation in the molecule. Thus, monomeric styrene is readily grafted to polybutadiene which is ethylenically unsaturated.

However, due to the chemical inertness and low unsaturation of polyethylene it has not been considered as a material susceptible to grafting. While polyethylene contains certain points, e. g. the tertiary carbon atoms at the points of branching, which can become sensitive after prolonged heating as in the milling of polyethylene at high temperatures (150° C.) in contact with air, the sensitivity induced by such drastic treatment results in a cross-linking and curing of the polyethylene and is, therefore, not a method adaptable to grafting.

It has now been discovered that polyethylene can be rendered susceptible to grafting, and in the process disclosed in this invention, it is believed that a free radical or active point is created along the main stem or backbone of ethylene homopolymer which active point initiates polymerization of the added monomer. Subsequent propagation of the growing branch by addition of monomer units continues until termination occurs by chain transfer or some other mechanism. The result is that a polymeric side chain or branch is grafted to the main stem or trunk polyethylene molecule.

Thus it has been found that the process to be employed to produce these graft copolymers of polyethylene depends on the following main factors.

(1) The presence of a free radical producing catalyst.
(2) The chemical structure of the monomer to be grafted.
(3) The ratio of monomer to polyethylene.

In addition to these chief factors, it has also been found that the temperature of the reaction and use of solvents are factors which contribute to the attainment of good yields of graft copolymers.

As to the first factor, the presence of a free radical producing catalyst has been found necessary to initiate the graft reaction since otherwise no detectable grafting occurs. Suitable are such catalysts as, for example, benzoyl peroxide, 2,4 dichlorobenzoyl peroxide, acetyl peroxide, tert-butyl hydroperoxide, tert-butyl peroxide, peracetic acid, t-butyl permaleic acid, lauryl peroxide, and the like. It has also been found that the added presence of certain catalyst accelerators, for example, cobaltous caproate and cobaltous stearate, are beneficial in the attainment of high conversions of the acrylic and methacrylic acid esters to their respective polymers and in such a way that a large proportion of these polymer chains are grafted to polyethylene. These accelerators are particularly effective where hydroperoxide catalysts are employed in the reaction mix. The preferred percentage by weight of accelerator employed for reasons of efficiency of grafting and economy are 2 percent to 5 percent based on the weight of catalyst employed. However, the most generally useful, and preferred, catalyst is benzoyl peroxide used with or without any accelerator.

The role played by the catalyst is not clearly understood. Apparently the manner of its functioning is related in some manner to the second factor, i. e. the chemical nature of the monomer, since it has been found that monomers vary in the readiness with which they can be grafted. Whether this is accomplished because the catalyst increases the grafting potentiality of the monomer or whether the catalyst renders the polyethylene more susceptible to the grafting of a particular monomer has not been demonstrated.

The third factor influencing grafting, namely the ratio of monomer to polyethylene, functions in this manner. When a vinyl monomer is grafted to polyethylene there occurs concomitantly with the formation of graft copolymer, polymerization to homopolymer of the monomer. This can be graphically represented as follows where E represents an ethylene segment

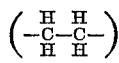

in a polyethylene chain and V represents a monomer segment in a vinyl polymer chain.

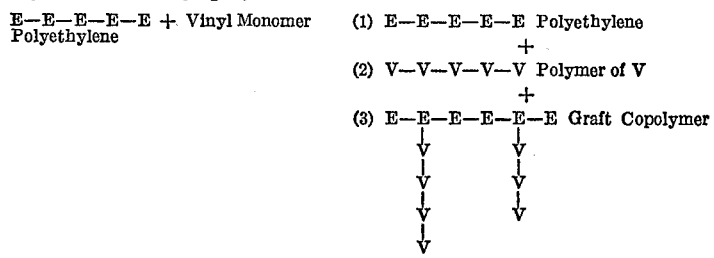

Thus the gross reaction product resulting when a monomer is grafted copolymerized to polyethylene can comprise some ungrafted ethylene homopolymer (1), some homopolymer of V (2), and some graft copolymer (3). However, the relative amount of homopolymer V, i.e. compared to the amount of V as grafted branches, contained in the gross reaction product can be controlled by varying the ratio of monomer to polyethylene in the initial mixture of these reactants charged to the reaction vessel. Thus, it has been discovered that as this ratio increases, the amount of homopolymer of V, relative to the amount of V in the graft copolymer, also increases.

The amount of catalyst employed is generally not less than 0.5, or more than 25 percent by weight of the monomer although greater and lesser amounts can be utilized, the upper limit being an economic one. Preferably, 5 to 15 percent catalyst by weight of the monomer is used. Concentrations of catalyst lower than 5 percent give relatively low grafting, however. The upper limits for catalyst concentration are based on economic rather than chemical considerations.

Time and temperature are also lesser factors which influence the reaction. Thus the time required to obtain highest grafting efficiency generally reaches a maximum beyond which it is not practical to go. To some extent this depends on the monomer, that is to say with monomers which graft readily the time required to get maximum grafting differs somewhat from those which are not so readily grafted. Generally speaking, however, most of the graft copolymer is formed during the first 4 to 15 hours of reaction. The temperature of the reaction is not critical but should be high enough to keep the polyethylene in solution and to decompose the catalyst into free radicals at a reasonable rate, i.e. 60° C. to 135° C. is preferred. Temperatures much above 135° C. tend to decompose some of the acrylate and methacrylate grafted branches and the acrylate and methacrylate homopolymers.

As stated, the gross reaction products obtained by the procedure of this invention are mixtures of unreacted homopolymeric ethylene, graft copolymer and homopolymer derived from the vinyl monomer used in the reaction. The content of this latter can be controlled, as stated, by varying the ratio of the monomer to polymer in the initial reaction charge. Separation of the various components of the reaction product can be accomplished by reason of their different solution behavior. This again will vary with the monomer employed for grafting. In general, however, it is more difficult to separate the graft copolymer from the ethylene homopolymer since usually the solution behavior of the graft copolymer is similar to that of the ethylene homopolymer.

The acrylic ester type graft copolymers with which this invention is concerned are difficult to separate from ethylene homopolymer.

That the gross reaction products of this invention are not mere mechanical mixtures of two homopolymers is determined by the fact that they cannot be separated into the respective homopolymers by simple extraction with suitable solvents as would be possible were they mechanical mixtures. Their physical properties also distinguish them from mechanical mixtures of homopolymers in that films prepared from such mixtures crack when flexed and blush when stretched, whereas films prepared from the gross reaction products can be flexed without cracking and do not blush when stretched.

It is not necessary to isolate the graft copolymers to obtain useful products. Indeed, for many purposes, the gross reaction products, or modified polyethylenes, obtained by graft copolymerization are useful as such. These products may range from soft to tough, hard materials. To some extent, this again will depend on the type of polyethylene used, e.g. graft copolymer derived from the low molecular weight polyethylene greases will usually be soft, grease-like materials while if a higher molecular weight polyethylene is used then the reaction products will be tough, hard materials. The character of the gross reaction product will also depend on the monomer used to prepare the graft copolymer and the properties of the polymer chains formed from said monomer. Thus, modified polyethylenes prepared with methyl methacrylate as the monomer are stiffer than the unmodified polyethylene, while modified polyethylenes prepared with methyl acrylate as the monomer are more pliable and elastic, i.e. rubber-like, than the unmodified polyethylene.

The content of graft copolymer in these reaction products is of importance. Thus, only minor amounts are required to effect a marked change in the properties of the materials.

All such reaction products are thermoplastic and can be formed into films, threads, tubes, rods, sheets, tapes, ribbons and similar shaped forms. For such purposes, it is usually desirable to have about 1 to 20 percent of grafted branches by weight of the homogeneous gross reaction product composition. In these reaction products, the graft copolymer can function as an internal plasticizer to soften and render the polyethylene more pliable, or it may act as a stiffening agent to give greater rigidity to the polyethylene. This will depend to some extent on the amount and character of the grafted chains.

The type of monomers which are suitable for grafting are those which undergo radical initiated polymerization, more commonly referred to as vinyl type of polymerization. The particular type of monoethylenic monomers with which this invention is concerned can be represented by the following generic formula:

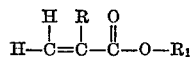

where R is either hydrogen or a methyl radical and $R_1$ is a linear or branched alkyl radical. The chain lengths of these alkyl substituents are not narrowly critical. However, lower alkyls, either linear or branched chained and containing 1 to 8 carbon atoms are generally preferred.

Since the molecular weight of the polyethylene does not affect the amount of grafting, polyethylenes having a wide range of molecular weight can be employed; either the so-called polyethylene greases or low molecular weight, hard polyethylene waxes, or the polyethylene resins of high molecular weight as hereinbefore described.

Illustrative of the monomers which it is intended to embrace within the scope of the present invention are, in addition to those disclosed in the examples following, ethyl acrylate, butyl acrylate, ethyl methacrylate, butyl methacrylate and octyl methacrylate.

The reaction is usually carried out in solution, employing hydrocarbon and chlorinated hydrocarbon solvents such as benzene, xylene, heptane, octane, dichloroethane, chlorobenzene, carbon tetrachloride or cyclohexane, although in some cases, particularly with the polyethylene greases, the monomer can constitute the solvent. Benzene is the preferred solvent. A useful concentration range has been found to be one to eight parts by weight of solvent to one part of polyethylene. A preferred range is two to four parts of solvent to one part of polyethylene on a weight basis. Lower amounts of solvent tend to give a gelled product, while higher amounts of solvent lead to relatively lower grafting.

The polyethylene is usually dissolved in the appropriate solvent, with the solution heated to reflux temperature. The monomer, an alkyl ester of acrylic or methacrylic acid as described above, and catalyst are then added gradually and the reaction mixture refluxed for a period varying from about 4 to 24 hours or more. The volatiles are then removed by evaporation, the last traces usually by milling the polymer on differential rolls. The reaction can also be carried out under pressure.

The characteristics of the gross reaction products are determined, to some extent, by the monomer used in the formation of the graft copolymer. This is also a factor in the commercial utility of the products disclosed in this invention. Thus, the reaction product of polyethylene with methyl methacrylate or methyl acrylate is outstanding in adhesion to cellophane and metal foils. The polyethylenes modified with methyl methacrylate display particularly good resistance to "environmental stress cracking." In addition, the products prepared with 2-ethyl hexyl acrylate are found to be more soluble in paraffin wax at elevated temperatures (70–75° C.) than the unmodified polyethylene. This is important since wax coatings are more resistant to flaking and impact when minor amounts of polyethylene (5 percent) are present. However, unmodified polyethylenes are not sufficiently soluble in waxes at the normal coating temperatures of 70–75° C.

Of particular practical interest in the packaging field is the improved adhesion to aluminum foil and cellophane film obtained with these acrylic and methacrylic ester polyethylene products and their unexpectedly greater retention of printing inks compared to the original polyethylene, and other graft copolymers thereof.

The invention is illustrated in greater detail in the following examples:

EXAMPLE 1

(a) Three hundred grams of polyethylene of an average molecular weight (M.W.) of 21,000 (Bakelite Co. DYNH) and 2000 grams of benzene were heated to 80° C. in a five liter glass vessel with continual stirring. After 1⅔ hours a clear solution was obtained and 150.1 grams of methyl methacrylate was added along with 0.726 gram of benzoyl peroxide dissolved in 100 grams benzene. The system was purged with nitrogen gas and heating at 80° C. was continued under nitrogen for 2½ hours at which time an additional 400 grams of benzene was added to reduce the viscosity of the reaction mass. Heating at 80° C. was continued for another 9½ hours, then 0.006 gram of hydroquinone was added to the solution to inhibit further reaction and the reaction mixture was poured into trays. The major portion of the benzene was allowed to evaporate at room temperature and the reaction product was subsequently milled on differential rolls at 120° C.–130° C. for eight to ten minutes to remove residual solvent and monomer. The amount of volatile-free product obtained was 350.2 grams. Infrared analysis showed that the reaction product contained 15.4 percent polymerized methyl methacrylate.

(b) Ten grams of the reaction product from (a) were dissolved in 1000 ml. of hot benzene, and, then, the solution was cooled to room temperature. The resulting precipitate was isolated by filtration, washed with 500 ml. of cold benzene, again dissolved in hot benzene and, as before, the solution was cooled and the resulting precipitate recovered by filtration. This extraction was repeated a third time. After each extraction the precipitate was analyzed by infra-red spectrophotometry for polymerized methyl methacrylate with the following results.

Polymerized Methyl Methacrylate
Unextracted Reaction Product from (a) _____ 15.4
Precipitate from 1st Extraction _____ 5.2
Precipitate from 2nd Extraction _____ 4.6
Precipitate from 3rd Extraction _____ 4.6

(c) A physical blend of 85 parts polyethylene with 15 parts of polymethyl methacrylate was prepared for comparison with the reaction product of (a).

The polymethyl methacrylate used in this physical blend was prepared by adding 300.3 grams of inhibitor-free methyl methacrylate and 1.45 grams of benzoyl peroxide to 2000 grams of benzene in a glass reaction vessel, purging the system with nitrogen gas, and heating the solution at 80° C. for 16.5 hours. The resulting clear reaction mass was poured into an excess of 1:1 methanol: water mixture. The precipitate so obtained was filtered and washed with methanol to yield a product essentially free of benzene and monomeric methyl methacrylate. After removal of residual volatiles by milling this product on hot rolls at 120° C. for five minutes, 201 grams of polymethyl methacylate were recovered.

Forty-five grams of this polymethyl methacylate, 255.0 grams of polyethylene of a M.W. of 21,000 (Bakelite Company DYNH) and 2500 grams of benzene were heated at 80° C. with continual stirring in a glass vessel. After 2.5 hours, a clear solution was obtained which was poured into trays and a major portion of the benzene was allowed to evaporate at room temperature. Residual benzene was removed by milling the product on rolls at 135° C. for ten minutes.

The blend was then extracted in a manner similar to that described with the reaction product from (a). The precipitate was analyzed by infra-red spectrophotometry for polymethyl methacrylate with the following results.

| | Percent Polymethyl Methacrylate |
|---|---|
| Unextracted Physical Blend | 15.0 |
| Precipitate from 1st Extraction | 0.6 |
| Precipitate from 2nd Extraction | 0.1 |

From this it was evident that polymethyl methacrylate was practically completely extracted from the polyethylene in a physical blend of the two polymers. In contrast, 4.6 percent by weight of the product from (a) was polymerized methyl methacrylate after the repeated extractions of (b) showing that this polymerized methyl methacrylate is chemically combined with some of the polyethylene.

EXAMPLE 2

(a) Three hundred grams of polyethylene of an average molecular weight of 21,000 (Bakelite Company DYNH) dissolved in 2000 grams of benzene were reacted with 300 grams of methyl methacrylate, using 1.45 grams of benzoyl peroxide as catalyst, after the manner described in Example 1 (a). The reaction product isolated as described in Example 1 (a) had a polymerized methyl methacrylate content of 36.3 percent by infrared analysis.

(b) The product from (a) was extracted with benzene as described in Example 1 (b) and the extracted product had a polymerized methyl methacrylate content of 8.5 percent.

EXAMPLE 3

(a) Three hundred grams of polyethylene of an average molecular weight of 21,000 (Bakelite Company DYNH) dissolved in 2300 grams of benzene was reacted with 100 grams of methyl methacrylate, using .484 gram of benzoyl peroxide, after the manner described in Example 1 (a). The reaction product was recovered as described in Example 1 (a) and had a polymerized methyl methacrylate content of 10.0 percent by infra-red analysis.

(b) The product from (a) was extracted with benzene as described in Example 1 (b) and the extracted product had a polymerized methyl methacrylate content of 2.85 percent.

EXAMPLE 4

(a) Three hundred grams polyethylene of an average molecular weight of 21,000 (Bakelite Company DYNH) dissolved in 2300 grams benzene were reacted with 300 grams of methyl methacrylate, using 1.45 grams of benzoyl peroxide, after the manner described in Example 1 (a). The reaction product isolated also by the procedure described in Example 1 (a) had a polymerized methyl methacrylate content of 56.5 percent by infra-red analysis.

(b) The product from (a) was extracted with benzene as described in Example 1 (b) and the extracted product had a polymerized methyl methacrylate content of 8.6 percent.

EXAMPLE 5

(a) Three hundred grams of polyethylene (M.W.—21,000) (Bakelite Company DYNH) dissolved in 2300 grams benzene was reacted with 200 grams of methyl methacrylate, using 0.968 gram of benzoyl peroxide. The reaction product isolated after the manner described in Example 1 (a) had a polymerized methyl methacrylate content of 25.0 percent by infra-red analysis.

(b) The product from (a) was extracted with benzene as described in Example 1 (b) and the extracted product had a polymerized methyl methacrylate content of 5.7 percent.

(c) A physical blend of 25 parts polymethyl methacrylate and 75 parts of polyethylene (M.W.—21,000) (Bakelite Company DYNH) was prepared in a manner similar to that described in Example 1 (c).

The unextracted reaction products of the above examples are thermoplastic and can be injection molded or extruded into films, rods or filaments which are very much like products similarly obtained from the original polyethylene in appearance, flexibility and toughness. Table I gives the physical properties of bars of these reaction products and unmodified polyethylene injection molded at a pressure of 10,000 p.s.i. and temperatures of 160–200° C. It is evident from this table that tensile strength does not differ greatly from the polyethylene used in preparing the products. However, the tensile modulus and heat distortion increases somewhat whereas the elongation decreases with increased polymerized methyl methacrylate content.

For comparison purposes results are also given in Table I for the physical blends of polyethylene and polymethyl methacrylate of Example 1 (c) and 5 (c). These blends have compositions comparable to the reaction products obtained in Example 1 (a) and 5 (a) respectively. These results show that the physical blends have properties which are similar to the corresponding methyl methacrylate polyethylene reaction products. However, the former are significantly lower in tensile strength. In addition, films of these physical blends "blush" or "whiten" when creased, a defect not displayed by the reaction product films. Furthermore, the reaction product films are superior to the physical blend films in clarity and tear resistance. Finally, the reaction products can be cold drawn while the physical blends rupture when cold drawing is attempted.

*Table I*

| | Percent Polymerized Methyl Methacrylate | Tensile Tests | | | 66 psi. Heat Distortion, °C. | Rossi Peakes Flow Seconds[1] |
|---|---|---|---|---|---|---|
| | | Strength, psi. | Modulus, psi. | Elongation, percent | | |
| Polyethylene | 0 | 1,770 | 19,000 | 54 | 41 | 79 |
| Ex. 3 | 10.0 | 1,850 | 18,000 | 55 | 42 | 51 |
| Ex. 1 (a) | 15.4 | 1,740 | 28,000 | 46 | 46 | 55 |
| Ex. 1 (c) | 15.0 | 1,340 | 20,000 | 33 | 46 | 66 |
| Ex. 5 (a) | 25.0 | 1,790 | 22,000 | 47 | 46 | 66 |
| Ex. 5 (c) | 25.0 | 1,170 | 21,000 | 38 | 42 | 78 |
| Ex. 2 | 36.3 | 1,740 | 42,000 | 38 | 47 | 73 |
| Ex. 4 | 56.5 | 1,900 | 56,000 | 8 | 56 | 73 |

[1] Seconds to flow 1.5 inches at 120° C. and 500 p.s.i.

EXAMPLE 6

Three hundred grams of a polyethylene, having an average molecular weight of 21,000 (Bakelite Company DYNH) were placed along with 750 grams of benzene into a 2000 ml. glass reactor equipped with heating mantle, heavy duty stirrer, and condenser. This was gradually heated to the reflux temperature (80° C.) for 2¾ hours until a clear solution had resulted. At this point, 5.6 grams of benzoyl peroxide, dissolved in 150 grams of benzene, were added and allowed to mix. Then 37.5 grams of inhibitor-free methyl methacrylate monomer were added over a 10 minute period. The reaction was permitted to continue at the reflux temperature for a total of 16 hours after which 0.5 gram of hydroquinone, dissolved in 400 grams of benzene, were added slowly. The reaction mass was permitted to mix for an additional 10 minutes, and was poured into a tray in order to remove most of the solvent and residual monomer by evaporation at room temperature. The last traces of volatiles were removed by milling at 125° C. for five minutes.

Two grams of this gross reaction product were dissolved in 200 ml. of boiling benzene, and the solution was permitted to cool gradually to room temperature. The resulting precipitate was separated from the solvent and the dissolved methyl methacrylate homopolymer by filtration. This extraction process was repeated three times. The gross reaction product contained 9.5 percent polymerized methyl methacrylate, 72 percent of which was retained by the product after extraction. Films and injection molded test bars of the gross reaction product were somewhat clearer and stiffer than those of the unmodified polyethylene.

This product was tested for ink adhesion by the following method: Films of the product were passed (290° F., 1000 p.s.i.) which were circular, 7 to 10 inches in diameter, and between 25 and 35 mils in thickness. The ink employed was a mixture of 6 parts by volume of anhydrous methanol and 20 parts by volume of the following composition:

| Component: | Percent by weight |
|---|---|
| Di-2-ethylhexyl phthalate | 10 |
| Hydrolyzed vinyl acetate-vinyl chloride copolymer (i.e. 6% by wt. vinyl alcohol, 91% by wt. vinyl chloride, 3% by wt. vinyl acetate) having an intrinsic viscosity in cyclohexane at 20° C. of 0.57 | 10 |
| Cadmium red | 5.0 |
| Methyl isobutyl ketone | 41.5 |
| Toluol | 41.5 |

This was added to the rolls of an Anilox hand proofer (165 depressions per inch) with a medicine dropper and the rolls were slowly rotated to give complete roll coverage with a thin layer of ink. With this proofer, an ink band 4 inches wide and about 6 to 10 inches long was applied, manually, to the test film with moderate pressure. Drying of the ink, under ordinary room conditions, was allowed for one hour. The dried specimen was tested for its ink adhesion by applying a transparent, adhesive type, tape (Texcel brand, ½" wide) such as that described in U.S. Patent 2,415,901 across the ink band in such a way as to obtain essentially complete contact between the adhesive side of the tape and a portion of the inked test area of the sample film. Stripping of the tape was done forcefully and rapidly. In interpreting the results of this test, "excellent" means that none of the ink can be seen on the tape which has been stripped from the inked film. "Very good" and "good" ratings are assigned where the tape shows traces of ink but where no visible stripping of the ink layer from the sample film is observed. "Fair" and "poor" ratings refer to those cases where 1 to 15 percent and 15–50 percent, respectively, of the ink layer was removed from the sample, while "very poor" applied when 50 percent, or more, of the ink is transferred to the tape. The unmodified polyethylene (M.W.–21,000) gives a "very poor" rating in this test, while the reaction product of this example rated "very good" to "excellent" in four successive tests.

The adhesion of this modified polyethylene, in film form, to cellophane and aluminum foils was also considerably greater than the adhesion of the unmodified polyethylene to cellophane and aluminum foils. This property was tested by pressing the samples, of the original polyethylene and the modified polyethylene, between two cellophane or aluminum foils at 290° F. and 500 p.s.i. The force required to strip the sample film, so formed, from the foils was taken as a measure of adhesion.

| | Adhesion (grams of force per inch of film width) | |
|---|---|---|
| | Cellophane | Aluminum |
| Polyethylene—9.5% Polymethyl Methacrylate Product | 155 | 390 |
| Unmodified Polyethylene | <5 | 300 |

This modified polyethylene was also subjected to the, now well established, "stress cracking" test, using 28 individual specimens of the modified and unmodified polyethylene. Specimens of modified and unmodified polyethylene, measuring 0.5 in. by 1.5 in. with a thickness of approximately 0.125 in., were punched from carefully molded sheets. A small slit was made on one side of each specimen, and the specimens were then stressed by bending them to a U-shape with the slit on the outside. While so stressed, the specimens were placed in a 5.901 in. by 0.709 in. (150 mm. by 18 mm.) test tube containing a surface-active agent. As the diameter of the tube was smaller than the length of the specimens, the specimens were forced to retain the U-shape and therefore remained continuously stressed. The surface-active agent employed was iso-octyl phenoxy polyoxyethylene ethanol (Igepal-CA630) manufactured by General Dyestuff Corporation. This compound was selected as it was known to produce rapid cracking of stressed polyethylene. It can be seen from the table below that the modified polyethylene has a much greater resistance to "stress cracking" than does the unmodified polyethylene.

| | Percent of Samples Failing | |
|---|---|---|
| Exposure (days at 50° C.) | Polyethylene Product, 9.5% Polymethyl methacrylate | Unmodified Polyethylene |
| 1 | 3.5 | 100 |
| 4 | 18 | |
| 7 | 29 | |
| 13 | 29 | |
| 20 | 46 | |

EXAMPLE 7

(a) Three hundred grams of polyethylene of an average molecular weight of 21,000 (Bakelite Company DYNH) were dissolved in 2580 grams of hot benzene and heated under reflux at 80° C. Then, 150 grams 2-ethylhexylacrylate was added dropwise over a five minute period and 1.5 grams of benzoyl peroxide, dissolved in 100 ml. benzene, was added. The reaction was continued for seven hours at 78–80° C. At the end of seven hours, a second portion (1.5 grams) of catalyst was added, and the reaction was continued for a total of 22.5 hours. The reaction mixture was then dumped into a sufficient volume of a 90/10 methanol/water mixture to precipitate the reaction product, the whole heated to boiling and the monomer, benzene, and methanol removed by steam distillation. The solid precipitate was isolated by filtration and dried. The dried product contained 33.3 percent polymerized 2-ethylhexylacrylate by infra-red analysis. Pressed films of this product were approximately as clear and tough as, but somewhat more elastic and pliable than, the unmodified polyethylene. In the printing ink adhesion test described above this product rated "good."

(b) Twenty grams of the product from (a) were dissolved in 300 ml. of hot benzene and added to 1200 ml. cold acetone. The whole system was heated to boiling and the precipitate removed by filtration. The precipitate was again boiled with a fresh portion of acetone (800 ml.) and separated by filtration. This procedure was repeated a total of three times. The final precipitate i.e. the extracted product, contained 8.1 percent polymerized 2-ethylhexylacrylate by infra-red analysis.

A physical blend of 20 parts of poly-2-ethylhexylacrylate (prepared in cyclohexane) and 80 parts of polyethylene (M.W.–21,000) when extracted by the procedure given in (b) yielded an extracted product which contained less than 1.0 percent poly-2-ethylhexylacrylate.

EXAMPLE 8

Three hundred and eighteen grams of a polyethylene having an average molecular weight of 10,000 (i.e. an intrinic viscosity in tetrahydronaphthalene of 0.7 at 75° C.) were dissolved in 350 grams of refluxing benzene in a 2 liter reactor equipped with a heavy duty stirrer, refluxing condenser, and heating device. When complete solution had taken place 3.405 grams of benzoyl peroxide were added, allowed to mix for 5 minutes, and 68.1 grams of inhibitor-free 2-ethylhexylacrylate monomer were added over a 10 minute period. After 4 and ½ hours of reaction at the reflux temperature (80° C.) an identical quantity of catalyst and monomer were added as described above. One-half hour later 0.5 gram of hydroquinone was added and mixed with the reactor contents. The entire mass was then poured, air dried, further dried on a hot (150° C.) 2-roll mill and ground. Analysis and extraction indicated that 33 percent of the product was poly-2-ethylhexylacrylate, 72 percent of which was chemically combined with the polyethylene in the form of a graft copolymer.

A mixture of 5 percent of this gross reaction product with 95 percent U.S.P. paraffin wax (melting point 56–58° C.) had a cloud point of 74° C. At the same concentration the unmodified polyethylene, molecular weight 10,000 in paraffin wax had a cloud point of 78° C. The cloud point is measured by slowly allowing the temperature of the hot (90–100° C.) solution of the polyethylene in wax to drop until there is a sharp decrease in the transparency of the solution. The temperature at which the first sign of such a decrease in transparency occurs is the cloud point i.e. the temperature at which the polyethylene begins to precipitate.

EXAMPLE 9

(a) Three hundred grams of polyethylene of an average molecular weight of 21,000 (Bakelite Company DYNH) dissolved in 2400 grams benzene at 80° C. and 150 grams methyl acrylate added dropwise. Then 1.5 grams benzoyl peroxide, in 100 ml. benzene, was added and nitrogen bubbled through the reaction mixture. The reaction became very viscous after about two hours. After 8½ hours total reaction time at 80° C. the mixture was poured into an excess of a 90/10 methanol/water solution. The unreacted monomer and solvent was removed by steam distillation and the reaction product was separated by filtration. The final product was a white, flaky, solid containing 32 percent polymerized methyl acrylate by infra-red analysis.

(b) A ten gram sample of the reactive product from (a) was dissolved in 100 ml. benzene and then added 1000 cc. acetone. The whole system was heated to boiling and filtered. The precipitated solid was boiled up with 500 ml. of fresh acetone and again isolated by filtration. This procedure was repeated a total of three times. The extracted product contained 13.3 percent polymerized methyl acrylate by infra-red analysis.

A physical blend of 13 parts of polymethylacrylate and 87 parts of polyethylene when extracted by the procedure given in (b), yielded an extracted product which contained less than 0.5 percent polymethylacrylate by infra-red analysis.

Films prepared from the monomer-free reaction product (Ex. 8 (a)) were quite pliable, more so than unmodified polyethylene. The material could be drawn out similarly to a natural rubber without blushing.

EXAMPLE 10

One hundred and sixty-four grams of a polyethylene of an average molecular weight of 21,000 (Bakelite Company DYNH) were dissolved in 400 grams of toluene at the reflux temperature (108° C.) in a 2000 ml., round bottom flask equipped with a heating device, a high-speed stirrer, and condenser. When solution had taken place, 3.94 grams of benzoyl peroxide were added and dissolved, and 39.4 grams of inhibitor-free methyl acrylate monomer were added. The air in the reactor was displaced with nitrogen and the material was allowed to react for 4 hours. The reactor, was, then, emptied of its contents and the solvent removed from the gross reaction product by rolling the material on a hot (150° C.) 2-roll mill. Infra-red analysis of the gross reaction product showed that it contained 19 percent polymethyl acrylate. Five grams of the dried gross reaction product were dissolved in 75 ml. of boiling benzene and the resulting solution dumped into 500 ml. of cold acetone. The flaky precipitate was separated by filtration. This procedure was repeated twice in order to remove all of the polymethyl acrylate homopolymer in the benzene-acetone filtrates. Analysis of the extracted sample showed that 74 percent of the methyl acrylate reacted was chemically combined with the polyethylene to form the graft copolymer.

Pressed films (10 mils in thickness) of the gross reaction product were considerably more pliable and flexible than films made from the unmodified polyethylene. The ink adhesion rating of the gross product, in this case was "excellent." Even after mechanically blending the product with an equal portion, by weight of unmodified polyethylene, the resultant mix had a "very good" rating in ink adhesion. As is illustrated below the modified polyethylene of this example also displayed better adhesion to cellophane and aluminum foils than the unmodified polyethylene.

| | Adhesion (grams of force per inch of film width) | |
|---|---|---|
| | Cellophane | Aluminum |
| Polyethylene (mol wt. 21,000) | 5 | 300 |
| 19% Polymethylacrylate—81% polyethylene graft copolymer | 210 | 460 |

EXAMPLE 11

One hundred and forty-six grams of polyethylene of an average molecular weight of 21,000 (Bakelite Company DYNH) were dissolved in 475 grams of benzene in a one liter, 3-neck, glass flask equipped with a heavy duty air stirrer and condenser. The flask was immersed to the half-way mark in an oil bath kept at 90° C. When a clear solution had formed, after about two hours of stirring, 16.75 grams of a mixture of 50 percent 2,4-dichlorobenzoyl peroxide and 50 percent dibutyl phthalate, dissolved in 75 grams of benzene, was added and allowed to mix for 5 minutes. Then 35.1 grams of inhibitor-free methyl acrylate monomer was added over a five minute period. The reaction was continued at the reflux temperature (80° C.) for 21½ hours. The material was then poured from the flask, air dried of the solvent, and, finally, dried on a hot (150° C.) 2-roll mill.

To remove the high boiling phthalic acid esters, which would interfere in the analysis, a small portion of the gross product was placed into boiling distilled water. The boiling was continued until the vapors coming off were odorless. The resulting solid was then dried and analyzed. It contained 19.3 percent polymerized methyl acrylate monomer. Another portion of the gross reaction product was extracted twice with benzene-acetone, as explained in the preceeding example. Subsequent analysis showed that the extracted sample contained 14.3 percent polymerized methyl acrylate. This amount was, therefore, chemically combined with the polyethylene.

The dried gross product was very elastic, pliable, and relatively clear when pressed in films. It rated "very good" to "excellent" in the ink adhesion test.

EXAMPLE 12

One hundred and forty-six grams of a polyethylene of an average molecular weight of 21,000 (Bakelite Company DYNH) were dissolved in about 475 grams of benzene in a one liter, 3-neck flask equipped with a heavy duty air stirrer and condenser. The flask was immersed to the half-way mark in an oil bath kept at 90° C. After two hours of stirring, a clear solution had formed and 0.2 gram of pure cobalt stearate was added and permitted to dissolve. Then, 35.1 grams of inhibitor-free methyl acrylate monomer were added to the solution over a five minute period, followed by 3.92 grams of pure tertiary butyl hydroperoxide, dissolved in 75 grams of benzene. The reaction was continued at the reflux temperature (80° C.) for a total of 69 hours. The gross reaction product was then poured, air dried and, finally, dried on a hot (150° C.) 2-roll mill. The gross reaction product contained 12.4 percent polymerized methyl acrylate. Extraction with acetone and benzene as described above showed that the dried extracted material contained 9.4 percent polymerized methyl acrylate which was chemically combined with the polyethylene. Films of the product were elastic, pliable, clear and rated "very good" in the ink adhesion test.

EXAMPLE 13

(a) One hundred and forty-six grams of polyethylene of an average molecular weight of 21,000 (Bakelite Company DYNH) and 550 grams of benzene were heated with continual stirring to a clear solution at 80° C. in a one liter, 3-neck glass vessel, at which time 3.92 grams of tert. butyl hydroperoxide dissolved in 90 grams of benzene were added, followed by 0.2 gram of cobalt stearate. To this reaction mix was then added 35.1 grams of methyl acrylate monomer. The system was purged with nitrogen gas and heating was continued for a period of 24 hours. The major portion of the benzene was allowed to evaporate at room temperature and the reaction product was subsequently milled on differential rolls at 120° C. to 130° C. for eight to ten minutes to remove residual solvent and monomer.

A three gram sample of this gross reaction product was dissolved in 200 ml. of boiling benzene, and the solution permitted to cool gradually to room temperature. The resulting precipitate was separated from the solvent and the dissolved methyl acrylate homopolymer by filtration. This extraction process was repeated three times.

Infra-red analysis showed that the gross reaction product contained 17.4 percent of grafted polymerized methylacrylate and methylacrylate homopolymer, a conversion of 87 percent by weight of methyl acrylate monomer to polymer form. Of this, 75 percent was grafted to the polyethylene and 25 percent was methyl acrylate homopolymer.

(b) The procedure of Example 13 (a) was repeated omitting the catalyst accelerator, cobalt stearate. The resultant gross reaction product contained 5 percent polymerized methyl acrylate of which approximately 40 percent was grafted to the polyethylene.

We claim:

1. The process which consists in heating in contact with a catalyst selected from the group consisting of benzoyl peroxide, 2,4-dichlorobenzoyl peroxide, acetyl peroxide, tert-butyl hydroperoxide, tert-butyl peroxide, lauryl peroxide, peracetic acid, tert-butyl permaleic acid, and mixtures thereof, a preformed normally solid polyethylene, and a monomeric carboxylic acid ester selected from the group consisting of lower alkyl esters of acrylic acid and lower alkyl esters of methacrylic acid, said polyethylene being dissolved in an aromatic solvent therefor, to form a homogeneous mixture comprising ethylene homopolymer, a second homopolymer of the said carboxylic acid ester, and a graft copolymer of polyethylene and the said carboxylic acid ester, and thereafter removing said aromatic solvent.

2. The process according to claim 1 which includes the further step of separating the carboxylic acid ester homopolymer from the homogeneous mixture.

3. The process according to claim 1 wherein the carboxylic acid ester is a lower alkyl ester of methacrylic acid.

4. The process according to claim 3 in which the carboxylic acid ester is methyl methacrylate.

5. The process according to claim 1 wherein the carboxylic acid ester is a lower alkyl ester of acrylic acid.

6. The process according to claim 5 in which the carboxylic acid ester is methyl acrylate.

7. The process according to claim 5 in which the carboxylic acid ester is 2-ethylhexyl acrylate.

References Cited in the file of this patent

UNITED STATES PATENTS

| | | |
|---|---|---|
| 2,405,817 | D'Alelio | Aug. 13, 1946 |
| 2,497,323 | Roedel | Feb. 14, 1950 |
| 2,703,776 | Leader | Mar. 8, 1955 |
| 2,837,496 | Vandenberg | June 3, 1958 |

FOREIGN PATENTS

| | | |
|---|---|---|
| 750,923 | Great Britain | June 20, 1956 |

OTHER REFERENCES

Billmeyer: "Textbook of Polymer Chemistry," Interscience Publishers, Inc., New York City (1957), pages 239–240.